United States Patent [19]
Parker

[11] 3,822,401
[45] July 2, 1974

[54] MEAN SQUARE TRANSDUCER

[75] Inventor: Harold F. Parker, Lee, Mass.

[73] Assignee: General Electric Company, Philadelphia, Pa.

[22] Filed: July 6, 1971

[21] Appl. No.: 159,939

[52] U.S. Cl............... 324/132, 324/99 R, 324/115
[51] Int. Cl...................... G01r 15/10, G01r 15/08
[58] Field of Search ..... 324/132, 99 D, 117 H, 115, 324/123 R, 99 R

[56] References Cited
UNITED STATES PATENTS

| | | | |
|---|---|---|---|
| 2,981,107 | 4/1961 | Anderson | 324/115 |
| 3,159,787 | 12/1964 | Sexton et al. | 324/123 R |
| 3,284,709 | 11/1966 | DePaolo | 324/99 R |
| 3,634,763 | 1/1972 | Micale | 324/99 D |

OTHER PUBLICATIONS

Korn et al.; Electronic Analog Computers; McGraw-Hill Book Co.; 1956; pp. 12-15.

*Primary Examiner*—Alfred E. Smith
*Assistant Examiner*—Ernest F. Karlsen
*Attorney, Agent, or Firm*—Albert S. Richardson, Jr.; J. Wesley Haubner

[57] ABSTRACT

Apparatus for measuring the root mean square of a signal by applying the signal across a resistance which is the input to an amplifier and controlling the resistance so that a constant level of current will always flow into a multiplier. The average output from the multiplier is compared with a fixed reference, and any error therebetween is effective through servo control mechanisms to vary the input resistance as necessary to reduce the error to zero. The input resistance is coupled to an output resistance and the value of the output resistance will be proportional to the voltage of the signal being measured.

6 Claims, 1 Drawing Figure

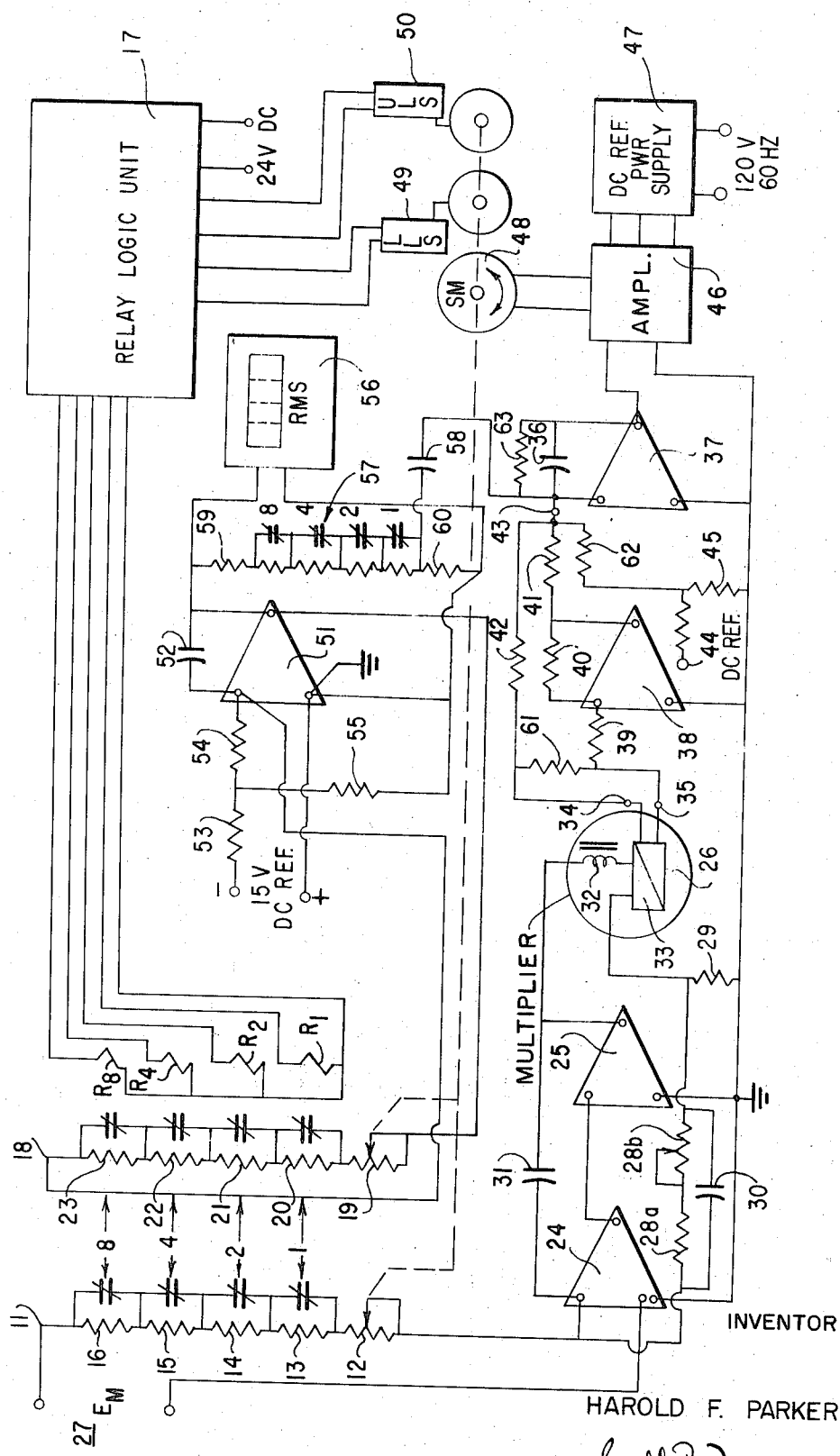

MEAN SQUARE TRANSDUCER

BACKGROUND OF THE INVENTION

1. Field of the Invention

The present invention relates to the measurement of the root mean square of an a-c signal. More particularly, this invention relates to a circuit wherein the root mean square is determined by means of a Hall device in a unique measuring circuit. This invention is particularly useful in the testing of steel parameters.

2. Description of the Prior Art

This invention teaches a unique solid state transducer which will produce an accurate RMS measurement. To accomplish such a result in the present art, four basic approaches are taken. These approaches involve electrodynamic instruments, thermocouples, lamp bridge networks, or Hall devices.

The electrodynamic instruments have a disadvantage in that they either require too much power to drive, or the instruments are extremely sensitive to mechanical vibrations. The disadvantages of thermocouples and lamp bridge networks are to be found in their sensitivity to ambient temperature changes, and the fact that they are easily burned out and produce a very low level of DC output.

The recently-developed Hall devices are relatively accurate, rugged, and produce a usable DC output if operated at a relatively high current level. If the field coil and crystal element of the Hall device are connected in series, the resulting DC output from the Hall device will be proportional to the square of the alternating current flowing in the Hall device. Thus the average DC output voltage of the Hall device corresponds to the square of the RMS value of the input current and can easily be converted by a square root scale to a true RMS measurement While such an arrangement has been generally satisfactory for measuring RMS values whose range of variation is relatively limited, its accuracy is not as uniformly high as is desirable for many applications where the signal being measured may vary over a wide range.

The prior art difficulties have been substantially overcome by this invention.

The RMS transducer of the present invention is especially applicable to a system in which computerized digital control is desired. Prior art now known to applicant is illustrated in U.S. Pat. N0. 3,501,771— Miller et al.

SUMMARY OF THE INVENTION

An object of this invention is to provide an accurate RMS measuring circuit used in the testing of sheets of steel. These RMS measurements may be utilized with a digital computer.

Another object of this invention is the utilization of a Hall device to provide an accurate RMS measurement over a wide range of voltage variations.

A further object of the invention is to provide a unique solid state transducer for use in the measurement of steel parameters.

Still a further object of the invention is to provide an RMS measuring system utilizing a uni-directional servo system.

In carrying out my invention in one form, the true RMS value (E) of a variable alternating voltage is indicated by applying the voltage to the input circuit of a multiplier such as a Hall device so that the multiplier is driven by a current that varies directly with E and inversely with the ohmic value (R) of a controllable resistance in the input circuit. The output voltage of the multiplier is a measure of the input current squared. Suitable control means is provided for varying R as necessary to maintain the average magnitude of this output voltage substantially constant, and additional means is provided to produce an indicating signal dependent on the amount of R. Since R tracks E, the indicating signal serves as an accurate measure of E.

The aforesaid control means comprises an integrator whose input is an error signal reflecting the difference, if any, between the average magnitude of the output voltage of the multiplier and a predetermined constant reference level and whose output sets R. Preferably this is accomplished by using a servo system including a motor provided with an upper limit switch and a lower limit switch. The motor is excited in accordance with the error signal and adjusts a rheostat, which is part of the total input resistance, so as to hold the current that drives the multiplier constant for a limited range of voltage variations. If the upper limit switch of the servo motor is actuated before a balance (zero error) is obtained, a relay logic unit will operate appropriate relays associated with discrete resistors of appropriate values to increase the input resistance in steps until the proper amount of resistance is reached to allow the rheostat to determine the precise amount of R that results in the error signal being reduced to zero.

If the voltage being measured falls enough to cause adjustment of the rheostat to the low end of its limited ohmic range, the lower limit switch will be actuated. All the relays will be deactivated and the servo system will start all over and reach the proper balance by increasing the input resistance in binary coded decimal steps.

The readout of this transducer is obtained by mechanically ganging an output resistance to the input resistance. The output resistance determines the gain of a DC amplifier which is used to produce the aforesaid RMS indicating signal.

Other objects and advantages of the invention will become apparent to those skilled in the art upon reading the specification in conjunction with the drawing.

BRIEF DESCRIPTION OF THE DRAWING

The single FIGURE of the drawing is a schematic representation of the RMS transducer in accordance with this invention.

DETAILED DESCRIPTION

The invention may better be understood by reference to the following detailed description of an embodiment of the invention when taken in conjunction with the accompanying drawing:

Referring to the drawing, an input circuit comprises resistance 11 made up of a first variable resistor or rheostat 12 of 5K ohms and discrete resistors 13, 14, 15, and 16 in binary coded decimal steps of 2.5K ohms, 5K ohms, 10K ohms, and 20K ohms, all connected in series. By means of the movable arm of the rheostat 12 and an array of selectively operative relay contacts across the respective resistors 13–16, the ohmic value (R) of the input resistance can be continuously varied over a wide range.

The first variable resistor 12 of the servo-controlled input resistance 11 provides a vernier adjustment whose balancing range is limited to approximately 10 percent of the whole ohmic range over which the input resistance is required to vary. The other 90 percent is handled by the introduction of the discrete binary coded decimal steps of resistors 13 through 16 whose connection in the input circuit depend on the position of contactors actuated by the relays $R_1$, $R_2$, $R_4$, and $R_8$, which are controlled by the relay logic unit 17.

The output resistance 18 is mechanically ganged with the variable input resistance 11 in such a manner that a change in the input resistance 11 results in the corresponding change in the ohmic value of the output resistance 18. Output resistance 18 has a second variable resistor 19 of 5K ohms and second discrete resistors 20, 21, 22, and 23 of 2.5k ohms, 5K ohms, 10K ohms, and 20K ohms, all connected in series. This approach eliminates the need for a highly precise set of potentiometers to cover the entire range of resistance variation, and relatively small standard line servo-driven ganged rheostats can be utilized for the requisite vernier adjustment of R.

The input circuit of my RMS transducer is energized by an alternating voltage 27 of variable RMS value (E). The RMS value of current flowing in this circuit depends on the ratio of E to R. This alternating current is amplified by a pair of operational amplifiers 24 and 25 which are arranged to drive a Hall multiplier 26. The first stage amplifier 24 has a high gain and feeds the booster amplifier 25 which in turn supplies a large alternating current to the input terminals of the multiplier 26. This amplified input current also flows through a resistor 29 of fixed, small impedence (e.g. three ohms) which is connected between one of the input terminals of the Hall multiplier and ground. The current driving means also may include a feedback loop which takes the voltage developed across resistor 29 through a fixed resistor 28a of between 8 and 20K and a variable 1.25K resistor 28b to the input of amplifier 24. Capacitor 30 across the current feedback resistors 28a and 28b of amplifiers 24 and 25 is a small capacitor selected to compensate for slight differences in gain when operating at 66 and 400 Hertz. capacitor 31 connected between the input of amplifier 24 and output of amplifier 25 is a small 50 to 200 picofarad capacitor required to suppress the high frequency oscillations which tend to appear in the high gain amplifiers.

The Hall multiplier 26 used in this embodiment comprises a field coil 32 and crystal element 33 connected in series between the input terminals. Consequently it produces at a pair of output terminals 34 and 35 and undulating DC voltage that is a measure of the square of the current supplied to its input, and the average magnitude of this DC output voltage corresponds to the square of the RMS value of the input current. The multiplying means used in this embodiment may be a Hall multiplier H-M 4050, such as manufactured by F. W. Bell, Inc.

In accordance with my invention, the average magnitude of the DC output voltage of the multiplier 26 is compared with a predetermined constant reference level and any difference or discrepancy therebetween is used to derive a proportionate error signal which actuates control means for changing the amount of resistance R in the input circuit of the multiplier as necessary to reduce the error to zero. In effect, as the applied voltage 27 varies the input resistance 11 is correspondingly varied to regulate the current that drives the multiplier to a constant RMS value. Consequently the amount of resistance in the input circuit will alwyas be proportional to the voltage being measured, and R therefore provides an accurate indication of the true RMS value E of the applied voltage.

The output voltage of the device 26 appears across a resistor 61 connected between the output terminals 34 and 35. It is desired to sense only the DC component of this voltage, and any AC signal with respect to ground existing at the output of the Hall device 26 has to be separated from the DC voltage.

In order to reject its AC component, and for amplifying the DC voltage which is proportional to the square of the current in the Hall multiplier 26 the output voltage of the multiplier is fed to a summing point 43 via two paths, one of which comprises an inverting amplifier 38 and its associated resistances. The amplifier 38 is connected to output terminal 35 through a resistor 39 of 10K ohms, and a resistor 40 of the same size is connected between the input and output of amplifier 38. An output resistor 41 of 10K ohms is connected at its free end to the summing point 43. Resistor 42 of 10K ohms connects the output terminal 34 of the multiplier 26 directly to the summing point 43.

Amplifier 38 produces a gain of one and results in a phase shift of 180° to the AC signal in the output of Hall multiplier 26. Coming out of the Hall multiplier, the DC voltage plus the AC signal simultaneously takes first path 34 through resistor 42 to a summing point 43 and takes second path 35 through input resistor 39 of amplifier 38 and through output resistor 41 to summing point 43. In that the AC signal through second path 35 has received a 180° phase shift caused by the inverting amplifier 38, and the AC through first path 34 and resistance 42 has not received a 180° phase shift, the AC voltage is thereby rejected or canceled with respect to ground.

A differential amplifier 37 compares the amplified DC voltage from the Hall multiplier 26 with a DC reference voltage 44 of approximately 15 volts across 6K ohms to 30K ohms resistor 45 through 1M ohm resistor 62 to the summing point 43. The differential amplifier 37 has a feedback resistor 63 of 1M ohm thereacross. A capacitor 36 across resistor 63 gives amplifier 37 a time constant and serves to smooth or average the undulations in the resulting error signal which consequently varies with the difference, if any, between the average magnitude of the voltage produced by the multiplier 26 and a predetermined constant level established by the DC reference voltage.

The resulting error signal from the output of differential amplifier 37 is amplified by an amplifier 46. The amplifier 46 has an associated DC reference power supply 47 which utilizes 120 volts 60 hertz power as its developing source. The output of this amplifier also furnishes the excitation for the servo motor 48 which positions the arm or slider of the rheostat 12 as a function of the integral of the error signal. So long as there is zero error, the servo system remains stationary with the rheostat arm in the correct position to set the input resistance at the proper amount of R to hold the driving current for the multiplier 26 at the predetermined constant RMS value that results in a balance between the average magnitude of the multiplier output voltage and the predetermined level established by the DC reference 44. As the RMS value E of the applied voltage varies, the input current tends to change and therefore an error signal will be developed. The servo motor responds to the error signal in a corrective sense by moving the rheostat slider to another position that adjusts the input resistance to a new value of R that causes the driving current to return to its predetermined constant value and thereby reduces the error signal to zero. The described regulating system is capable of continuously adjusting R over a vernier range which is approximately 10 percent of the whole range of expectable variations of the input voltage being measured.

To accommodate voltage variations beyond the 10 percent vernier range, the illustrated servo system also includes a lower limit switch 49 and an upper limit switch 50. If the upper limit switch 50 of the servo motor 48 is contacted before a balance is obtained by the rheostat 12 the relay logic unit 17 will actuate the relays $R_1$, $R_2$, $R_4$, and $R_8$, or combinations of these relays to increase the input resistance in steps until the proper amount of resistance is reached to allow the servo motor 48 to exercise control within the 10 percent balance range or between the upper limit switch 50 and lower limit switch 49. If the voltage 27 falls below a value which causes the rheostat 12 to seek a balance (zero error) at the lower end of its limited ohmic range, the lower limit switch 49 will be contacted. All the relays $R_1$, $R_2$, $R_4$, and $R_8$ will be deactivated and the servo control means will start over and reach the proper balance by increasing the input resistance 11 in binary coded decimal steps. This unidirectional servo control means greatly simplifies the relay logic and voltage sensing circuit required in the relay logic unit 17. The time required to obtain a balance is short enough to eliminate the need for a more complex bi-directional system.

Since the input voltage 27 may be obtained from the output of either a voltage or current buffer amplifier in a steel testing system, the value of 27 will usually fall between 0.1 and 1.0 volts, assuming the voltage in the buffer amplifier is utilized in normal steel testing. Also, assuming that the servo control means is balanced at its mid-range, that is 2.5K in the lower portion of the input resistance 11, and that 40 microamps of current is flowing in this resistance, then the relationship between the input voltage 27, input resistance 11, and the binary coded decimal relays that are actuated would be:

| Input Volts | Nominal Input Resistance | Relays Actuated BCD Code | Current Microamps |
|---|---|---|---|
| 0.1 | 2.5K | — | 40 |
| 0.2 | 5.0K | 1 | 40 |
| 0.3 | 7.5K | 2 | 40 |
| 0.4 | 10.0K | 1–2 | 40 |
| 0.5 | 12.5K | 4 | 40 |
| 0.6 | 15.0K | 1–4 | 40 |
| 0.7 | 17.5K | 2–4 | 40 |
| 0.8 | 20.0K | 1–2–4 | 40 |
| 0.9 | 22.5K | 8 | 40 |
| 1.0 | 25.0K | 1–8 | 40 |

The readout of the transistor is obtained by means responsive to the ohmic values of the input resistance 11. As illustrated, this is accomplished by mechanically ganging the second resistors or output resistance 18 to the input series of resistance 11. This output resistance 18 is connected as a feedback resistor across a DC output amplifier 51 whose gain is thus a function of the ohmic value thereof. The input to the operational amplifier 51 is a DC reference voltage of fixed magnitude, and the variable gain determines the output therefrom. Consequently the magnitude of the output signal from the amplifier 51 varies with R which in turn is proportional to E. Amplifier 51 has a capacitor 52 connected between its input and output. This capacitor 52 is a small 50 to 200 picofarad capacitor to suppress the high frequency oscillations that tend to appear in high gain amplifiers.

The input of amplifier 51 is the −15 volt DC reference divided down to 0.0959 volt by an input resistance divider. The means responsive to the output resistance for readout comprises the output operational amplifier 51 and the associated input resistance divider. This input resistance divider for amplifier 51 may be a resistor 53 of 15.1K ohms connected between the negative side of the 15 volt DC reference and to the free end of an input resistor 54 of 2.4 K ohms which is connected to a first input of amplifier 51. At the common connection of resistors 53 and 54 is a 100-ohm resistor 55. The other end of resistor 55 is connected to ground which is common with a second input of operational amplifier 51.

The gain of amplifier 51 is the effective ohmic value of the output resistance 18 (which depends on R) divided by 2.4K ohms. The magnitude of the output voltage of the amplifier 51 is therefore 25/2.4 (0.0959) which equals 1.0 volt when the servo control means is balanced to read an input voltage 27 of 1 volt. Thus the DC output voltage of this transducer is equal to the RMS value E of the input voltage 27 as read on the DC digital voltmeter 56 wherein the output of amplifier 51 drives voltmeter 56. The input resistance of 2.4K corresponds to a constant current of 40 microamps in the output resistance 18. The value of this resistance is selected to correspond to the parameters of a particular servo system.

As can be seen in the drawing, the servo system includes a stabilizing circuit 57 which is basically a resistive network connected across the output of the DC amplifier 51. The lower portion of circuit 57 is fed through a 13 microfarad capacitor 58 to the input of the servo amplifier 46. When the servo means is operating, this servo stabilizing circuit 57 provides a small transient voltage at the input of the amplifier 46 in opposition to the magnitude and polarity of the error signal of the differential amplifier 37. This transient voltage acts to dampen the action of the servo control means, prevents overshooting and provides the balance desired. The servo stabilizing circuit may contain values in binary coded decimal units activated by normally closed relays. Typical values of the series resistors making up the circuit 57 are 1K ohms, 2K ohms, 4K ohms, and 8K ohms. To couple the servo system to the output of amplifier 51, a 100 ohm resistor 59 in series with the stabilizing circuit is used. To couple the other end of the servo stabilizing circuit 57 to an input of the readout voltmeter 56, a 1K ohm resistor 60 in series with the stabilizing circuit is used.

While a view of the invention has been shown and described, it will be apparent to those skilled in the art that many modifications are possible. Values of resistors and capacitors are illustrative and changes in values may readily be made by those skilled in the art without departing from the inventive concept. The invention, therefore, is not to be restricted except insofar as is necessary by the prior art and by the spirit of the appended claims.

What is claimed as new and desired to be secured by Letters Patent of the United States is:

1. In combination:
   a. multiplying means having input and output terminals for producing at its output terminals a voltage which is a measure of the square of an alternating current supplied to its input terminals;
   b. an input circuit adapted to be energized by an alternating voltage of variable RMS value, said circuit including resistance of variable ohmic value and being arranged to supply to the input terminals of said multiplying means a current proportional to the ratio of said RMS value to said ohmic value;
   c. comparison means for deriving an error signal which varies with the difference between the average magnitude of the voltage at said output terminals and a predetermined constant reference level;
   d. control means actuated by said error signal for varying the ohmic value of said resistance as necessary to reduce said error signal to zero; and
   e. readout means responsive to said ohmic value for producing an indicating signal which varies therewith, whereby said indicating signal is a measure of said RMS value, said readout means including output resistance, means coupled to the resistance of said input circuit and operative in response to variations in said ohmic value for correspondingly changing the ohmic value of said output resistance, and means connected to said output resistance for producing a DC output voltage whose magnitude varies with the ohmic value of said output resistance.

2. Apparatus as in claim 1 wherein said multiplying means is a Hall device.

3. The combination of claim 1 wherein said means connected to said output resistance comprises an amplifier having a DC input voltage of fixed magnitude and having a variable gain which depends on the ohmic value of said output resistance.

4. Apparatus as in claim 3 including a readout voltmeter and wherein said voltage of said amplifier drives said readout voltmeter.

5. In combination:
   a. an input circuit adapted to be energized by an alternating voltage of variable RMS value, said circuit being operative to provide an AC signal whose RMS value is proportional to that of said alternating voltage and including resistance of variable ohmic value which determines the proportionality therebetween;
   b. means connected to said input circuit and responsive to said AC signal for deriving an error signal which varies with the difference between the average magnitude of the square of said AC signal and a predetermined DC reference level;
   c. control means comprising a servo system coupled to the resistance in said input circuit and excited by said error signal for causing adjustment of the ohmic value of said resistance as a function of said error signal so as to vary said proportionality as necessary to reduce said error signal to zero; and
   d. readout means for producing an indicating signal which varies with said proportionality, whereby said indicating signal is a measure of said RMS value, said readout means comprising
      i. output resistance,
      ii. means coupled to the resistance in said input circuit and operative in response to variations in said ohmic value for correspondingly changing the ohmic value of said output resistance, and
      iii. means connected to said output resistance for producing a DC output voltage whose magnitude varies with the ohmic value of said output resistance.

6. The combination of claim 5 in which said error signal deriving means comprises a Hall device having output terminals at which is produced a voltage which is a measure of the square of said AC signal and comparison means for deriving said error signal from the difference between the average magnitude of the voltage at said output terminals and said predetermined reference level.

* * * * *